(12) United States Patent
Lipscomb et al.

(10) Patent No.: US 9,113,610 B2
(45) Date of Patent: Aug. 25, 2015

(54) WATER WHEEL AERATOR ASSEMBLY FOR PET FOUNTAIN

(75) Inventors: John M. Lipscomb, Cedarburg, WI (US); Qing He, North Andover, MA (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 13/635,552

(22) PCT Filed: Dec. 4, 2011

(86) PCT No.: PCT/US2011/063213
§ 371 (c)(1),
(2), (4) Date: Jun. 12, 2013

(87) PCT Pub. No.: WO2012/075480
PCT Pub. Date: Jun. 7, 2012

(65) Prior Publication Data
US 2013/0255584 A1    Oct. 3, 2013

(51) Int. Cl.
*A01K 7/00* (2006.01)
*A01K 7/02* (2006.01)

(52) U.S. Cl.
CPC .... *A01K 7/00* (2013.01); *A01K 7/02* (2013.01)

(58) Field of Classification Search
CPC .................................. A01K 7/00; A01K 7/02
USPC ........ 119/211, 245, 263, 72, 74, 51.01, 51.04
See application file for complete search history.

(56) References Cited

U.S. PATENT DOCUMENTS

| 154,407 | A | | 8/1874 | Mason |
| 528,066 | A | | 10/1894 | Ariens |
| 1,163,152 | A | * | 12/1915 | Howard .................... 239/233 |
| 1,552,290 | A | | 9/1925 | Fowler |
| 1,893,507 | A | * | 1/1933 | Ranney .................... 446/156 |
| 2,037,278 | A | | 4/1936 | Siber |
| 2,272,582 | A | | 2/1942 | Poppe |
| 2,751,880 | A | * | 6/1956 | Markowski ................ 119/246 |
| 2,787,863 | A | | 4/1957 | Laird |
| 3,057,328 | A | | 10/1962 | Swartz |
| 3,126,870 | A | | 3/1964 | Matthew |
| 3,134,360 | A | | 5/1964 | Lewis |
| 3,784,024 | A | | 1/1974 | Kristy |

(Continued)

OTHER PUBLICATIONS

EP Search Report of EP 11 84 5139 (corresponding EP application), dated Jun. 27, 2014.

*Primary Examiner* — Rob Swiatek
*Assistant Examiner* — Ebony Evans
(74) *Attorney, Agent, or Firm* — Boyle Fredrickson S.C.

(57) ABSTRACT

An aerator assembly for an animal watering device having a rotor mount removably inserted in a discharge opening of a cover of the device and a rotor carried by the mount that is rotated by discharged water. The mount includes a conduit having one end inserted in the cover and an outlet at its opposite end conveying a discharged stream of water against rotor baffles causing rotation. The mount includes an arm that offsets an axis of rotation of the rotor relative to the stream so water impinges against a baffle. A pin can be included that engages the arm that is received through a rotor hub rotatively attaching the rotor to the arm. Such an aerator not only aerates water discharged during fountain operation, it also reduces noise by reducing splashing. The present invention is also directed to a pet fountain equipped with such an aerator assembly.

15 Claims, 4 Drawing Sheets

(56) References Cited

U.S. PATENT DOCUMENTS

| | | |
|---|---|---|
| 3,788,277 A | 1/1974 | Willinger et al. |
| D236,513 S | 8/1975 | Palmer |
| D237,391 S | 10/1975 | Willinger et al. |
| 3,933,126 A | 1/1976 | Gordon |
| D240,306 S | 6/1976 | Suchowski et al. |
| 3,999,519 A | 12/1976 | Rodemeyer |
| 4,023,915 A | 5/1977 | Kerby |
| 4,461,174 A | 7/1984 | Han |
| 4,526,134 A | 7/1985 | Sapp |
| 4,543,095 A | 9/1985 | Jensen |
| 4,574,822 A | 3/1986 | Helinsky |
| D285,592 S | 9/1986 | Kushner |
| 4,825,707 A | 5/1989 | Rosaen |
| 4,878,869 A | 11/1989 | Yamane et al. |
| 4,960,275 A | 10/1990 | Magon |
| 5,022,346 A | 6/1991 | Robertson |
| 5,039,180 A | 8/1991 | Lemons |
| 5,165,364 A | 11/1992 | Horkey |
| D342,587 S | 12/1993 | Bransky et al. |
| 5,370,247 A | 12/1994 | Handleman |
| 5,372,474 A | 12/1994 | Miller |
| 5,387,146 A | 2/1995 | Smith et al. |
| D361,172 S | 8/1995 | Gates |
| D369,817 S | 5/1996 | Hauch |
| 5,695,119 A | 12/1997 | Lien |
| 5,938,403 A | 8/1999 | Okada et al. |
| 6,029,688 A | 2/2000 | Kaufman |
| 6,394,030 B1 | 5/2002 | Geiger et al. |
| 6,499,939 B2 | 12/2002 | Downing |
| D471,326 S | 3/2003 | Weiser et al. |
| 6,557,491 B1 | 5/2003 | Weiser et al. |
| 6,561,129 B1 | 5/2003 | Cheng |
| D484,284 S | 12/2003 | Venson et al. |
| D498,510 S | 11/2004 | Berggren |
| D511,867 S | 11/2005 | Weiser et al. |
| 6,959,838 B2 | 11/2005 | Eddins et al. |
| 7,028,636 B2 | 4/2006 | Weiser et al. |
| D552,642 S | 10/2007 | Scheinman |
| D581,603 S | 11/2008 | Woltmann et al. |
| D591,006 S | 4/2009 | Ragonetti et al. |
| 7,559,173 B2 | 7/2009 | Brusatore |
| D611,507 S | 3/2010 | Martin |
| 7,770,539 B1 | 8/2010 | Zimmerman et al. |

\* cited by examiner

WATER WHEEL AERATOR ASSEMBLY FOR PET FOUNTAIN

FIELD

The present invention relates to an aerator for pet watering devices and more particularly to an in-line flow disposed water wheel aerator assembly for a pet fountain.

BACKGROUND

It is desired to maintain water recirculating in a pet fountain in as fresh of state as possible until water is added or replaced. While pet fountains have employed a filter in the past to help maintain freshness, improvements remain desirable.

What is needed is an arrangement that enhances freshness of water recirculating in a pet fountain. What is also needed is a water freshness-enhancing arrangement that is usable in a recirculating pet fountain.

SUMMARY

The present invention is directed to an aerator assembly for a recirculating pet fountain which helps maintain water freshness by aerating water discharged by a pump from a basin of the fountain into a fountain cover carrying the aerator assembly. The aerator assembly includes a rotor mount of tubular construction that is inserted into a discharge opening in the fountain cover to attach the aerator assembly to the cover. The rotor mount rotatively carries a rotor having a plurality of radially outwardly extending water-deflecting water flow directors that rotate when water is discharged from the discharge opening in the cover through an outlet of a tubular conduit formed of the rotor mount.

Part of the tubular conduit of the rotor mount is removably inserted and frictionally retained in that opening formed in the cover and is in line in fluid-flow communication with a pump that conveys water from the basin to the cover during fountain operation. In a preferred embodiment, the conduit has one end in fluid-flow communication with a discharge tube of the pump and the conduit outlet formed in its opposite end that directs water pumped by the pump against part of the rotor to cause rotor rotation.

The rotor mount includes at least one rotor mounting arm that disposes the water flow directors relative to the outlet in the rotor mount conduit so that a stream of water discharged from the conduit impinges against the water flow directors causing the rotor to rotate. In a preferred embodiment, the rotor mount has a fork with a pair of arms that offset a hub of the rotor relative to the rotor mount conduit outlet so water discharged from the conduit impinges against the water flow directors in a manner that causes rotor rotation.

Each rotor mounting arm can include a knuckle at or adjacent its free end having an opening defining a trunnion receiving a pin upon which the hub of the rotor can be rotatively carried. Each arm is configured to offset the hub and hence the rotor relative to a center of the rotor mount conduit outlet so water discharged from the conduit impinges against one of the flow directors in a manner that causes rotor rotation.

In a preferred embodiment, each flow director is a baffle having a width substantially as wide as the width or diameter of the tubular conduit opening. Each baffle has a length that enables the outer radial edge of each baffle to extend radially outwardly and substantially overlie a portion of the outlet opposite the offset imparted by each arm.

These and various other features, aspects, and advantages of the present invention will be made apparent from the following description of the drawings and detailed description.

DRAWING DESCRIPTION

One or more preferred exemplary embodiments of the invention are illustrated in the accompanying drawings in which like reference numerals represent like parts throughout and in which.

Figure 1:
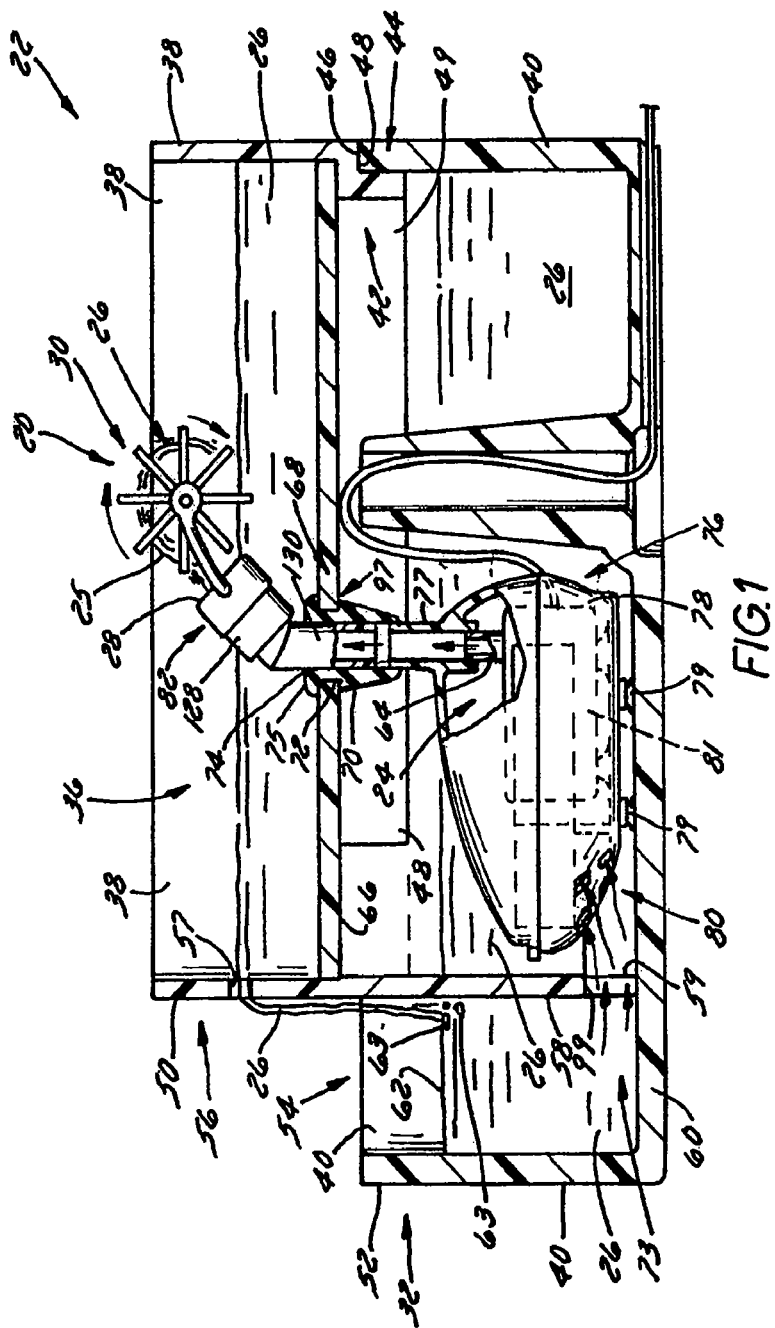
FIG. 1 is a perspective view of a pet fountain equipped with a water wheel aerator assembly constructed in accordance with the present invention having a water wheel being rotated in a clockwise direction by water discharged from a pump.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIG. 1 illustrates a preferred embodiment of an aerator assembly 20 for a recirculating pet fountain 22 that includes a pump 24 that discharges a stream 25 of water through an outlet 28 of the aerator assembly 20 causing the water 26 to impinge against a rotor 30 of the assembly 20 creating turbulence in the discharged water helping oxygenate the water. The aerator assembly 20 is a water wheel that not only helps oxygenate water 25 discharged from the aerator assembly outlet 28 but also helps prevent splashing while creating a visually enticing "bubbling" effect that is particularly attractive to cats.

The pet fountain 22 shown in FIG. 1 has a lower basin 32 in which water is received and which can hold a supply of water that the pump 24 recirculates during fountain operation. The fountain 22 also has a cover 34 that can also be configured as or with an upper basin 36 that receives water discharged from the aerator assembly outlet 28, including after the water has impinged against the rotor 30. Upper basin 36 can be open, such as shown in FIG. 1, permitting an animal to drink water 26 in the basin 36. Cover 34 overlies the pump 24 such that pump 24 is hidden by the cover 34.

Cover 34 includes a wall 38 that is configured to mate with part of an outer wall 40 of the lower basin 32 in a manner that locates the cover 34 relative to the lower basin 32 and helps retain the cover 34 in place relative to the lower basin 32.

Cover wall 38 has a bottom section 42 configured with a seat 44 that receives an outer edge 46 of lower basin wall 40 with the seat 44 including an abutment 48 that abuts lower basin wall edge 46 and a lip 49 that overlaps with part of the lower basin wall 40 to help locate the cover 34 as well as help keep the cover 34 in place once assembled to the basin 40.

Cover wall 38 mates via seat 44 with basin wall 40 along a substantial portion thereof to help locate and keep the cover 34 in place along at least one of a plurality of horizontal directions when seated on the basin 32. For example, where the lower basin 32 is circular, seat 44 can extend 180 degrees or more in extent to locate and help retain of the cover 34 on the lower basin 32. Where the lower basin 32 includes a plurality of walls, e.g., more than one lower basin wall 40, seat 44 extends along a portion of a plurality of the walls 40 to locate and help retain the cover 34 on the lower basin 32. Where oval or oblong, seat 44 extends along spaced apart wall sections of the lower basin wall 40 that are disposed opposite one another and can be disposed adjacent one another. Lower basin 32 can be generally Vee shaped dividing the lower basin wall 40 into separate wall sections along which extends at least a portion of seat 44.

Cover wall 38 has an upraised section 50 that is disposed inwardly and spaced from a section 52 of basin outer wall 40 to provide an open access area 54 big enough to allow an animal to drink from. Cover 38 can be configured with a weir 56 formed in part of cover wall 38 through which water 26 flows when it reaches a sufficient height in the upper basin 36 formed in the cover 38. During fountain operation, water 26 overflowing the weir 56 falls down into water in the open animal drinking access area 54 of the lower basin 32. In the preferred embodiment shown in FIG. 1, the weir 56 includes a plurality of spaced apart bores 57 (only one of which is shown in FIG. 1) through which water 26 overflows down into the open animal drinking access area 54 below.

Cover wall section 50 includes a skirt 58 spaced above a bottom 60 of the lower basin 32 a sufficient distance so as to enable water from the cover 38 flowing into the lower basin drinking access area 54 to flow underneath the cover 34 so it can be drawn into the pump 24. Skirt 58 extends downwardly a sufficient distance below the water line 62 of the water in the lower basin 32 such that the skirt 58 functions as a debris skimmer that helps prevent debris floating in the water 26 in the lower basin drinking access area 54 from being drawn into the pump 24. As is shown in FIG. 1, debris skimming skirt 58 extends to a point greater than half of the height of the adjacent lower basin wall section 52 and that is no more than about one-quarter inch above the basin bottom 60 to permit water to freely flow from the drinking access area 54 through at least one inlet 73 underneath the cover 34 while blocking debris from being drawn into the pump 24. If desired, the debris skimming skirt 58 can be configured to provide at least one foot 59 that rests on the basin bottom 60 supporting the cover 34 thereon while also separating a plurality of inlets 73 (only one inlet of which is shown in FIG. 1).

In one preferred embodiment, each inlet 73 is formed by a span 99 extending between a pair of spaced apart feet 59 with at least one of the feet 59 disposed adjacent or alongside part of the basin sidewall 40 and another one of the feet 59 intermediate a plurality of inlets 73. Such a span 99 can be curved or arched and extends below the water line 62 preventing debris 63 from reaching the pump 24.

Pump 24 has a discharge tube 64 that faces generally upwardly toward a top wall 66 of the cover 34 that also serves as the bottom 66 of the upper basin 36. The discharge tube 64 is operably coupled to a cover anchor tube 68 having a diametrically tapering outer wall 70 with a cover seating groove 72 adjacent a discharge end 74 that also serves as an anchoring grommet 75 that provides a water tight seal around the opening 97 in the upper basin 36 engaged by the cover anchor tube 68.

The pump 24 is shown in FIG. 1 received in a pump module 76 having a reclosable housing 78 with a perforate intake grate 80 disposed adjacent and facing toward the lower basin bottom 60. As is shown in FIG. 1, at least a portion of the intake grate 80 is disposed lower than a bottom edge of the debris-blocking skirt 58 of the cover 34 in order to help ensure water flow to the pump 24 even if some debris passes by skirt 58. Pump module 76 can include an interiorly disposed debris barrier in the form of a filter 81 (shown in phantom in FIG. 1) disposed between the intake grate 80 and the pump 24 to further prevent debris from being drawn into the pump 24. Such a filter 81 includes filter media and can include activated charcoal or the like to help filter and freshen water passing through the pump module 76 into the pump 24. Pump module 76 includes an outlet tube 77 extending between the pump discharge tube 64 and the cover anchor tube 68.

Pump 24 is resiliently mounted to the lower basin 32 in a manner that helps anchor the pump 24 and cover 34 in place but which also helps attenuate pump noise and vibration. While pump 24 can be mounted directly to the basin bottom 60 by a plurality of spaced apart flexible, resilient and elastomeric suction cups 79, the pump 24 is shown in FIG. 1 mounted by its suction cups to the pump module housing 78 which in turn is mounted to the basin bottom 60 by a plurality of spaced apart, flexible, resilient and elastomeric suction cups that provide a second level of pump noise and vibration attenuation. Anchor tube 68 is also made of a flexible, resilient and elastomeric noise and vibration attenuating material also helping to attenuate pump noise and vibration. Such a construction helps prevent transmission of pump noise and vibration to both the lower basin 32 and cover 34 producing quiet pet fountain operation.

Where the pump 24 is mounted directly to the basin bottom 60, the pump 24 can be used without any pump module housing 78. Where used without pump module housing 78, the cover anchor tube 68 is disposed in direct fluid-flow cooperation with the discharge tube 64 of the pump 24. If desired, the cover anchor tube 68 can be integrally formed of part of the cover 34, such as by being an integrally molded part of the cover 34.

In the preferred embodiment shown in FIG. 1, pump 24 is a submersible aquarium pump having an electromagnetically driven pump impeller within. Pump 24 is electrically powered via a cord that extends outwardly of the pump module housing 78 through an uprightly extending cord conduit integrally formed in the lower basin 32. Pump 24 is electrically powered via an electrical power source such as a utility power source operating at between 100 volts AC and 240 volts AC.

As discussed above, the aerator assembly 20 includes a rotor 30 configured to induce turbulence in the stream 25 of water discharged from the aerator assembly outlet 28 in a manner that aerates the water 25 as it falls into water 26 in the upper basin 34 thereby introducing oxygen into the water. The resultant turbulence produced by the water wheel 26 is beneficial in that it helps not only increase the oxygen level of the water recirculating in the fountain 22, it also helps release undesirable gases trapped in the water. Aeration also helps keep the water fresher, prevents stagnation and can help prevent growth of undesirable organisms, including algae, in the water in the fountain.

With additional reference to FIGS. 2-10, the water wheel aerator assembly 20 includes a rotor 30 that is carried by a rotor mount 82 having the aerator assembly outlet 28 formed therein with the mount 82 configured to be inserted into an opening in the cover 34, such as the opening in the anchor tube 68, in a manner that is quick and easy to do. When inserted, the rotor mount 82 is frictional but removably attached to the cover 34. The rotor mount 82 is tubular defining a water-flow conduit 83 having the aerator assembly outlet 28 at one end of the conduit 83 in line with water flow discharged from the pump 24. The mount 82 also has a fork 84 disposed at the outlet end of the conduit 83 formed of a pair of outwardly extending arms 86 that each include a knuckle 88 at or adjacent their free end with an opening 90 formed therein for receiving a pin 92 upon which the rotor 30 is rotatively carried. Rotor 30 has a hub 94 through which the pin 92 extends when assembled to the mount 82. Rotor 30 also has at least a plurality of pairs, i.e., at least three, baffles 96 that extend radially outwardly from the hub 94.

Figure 3:
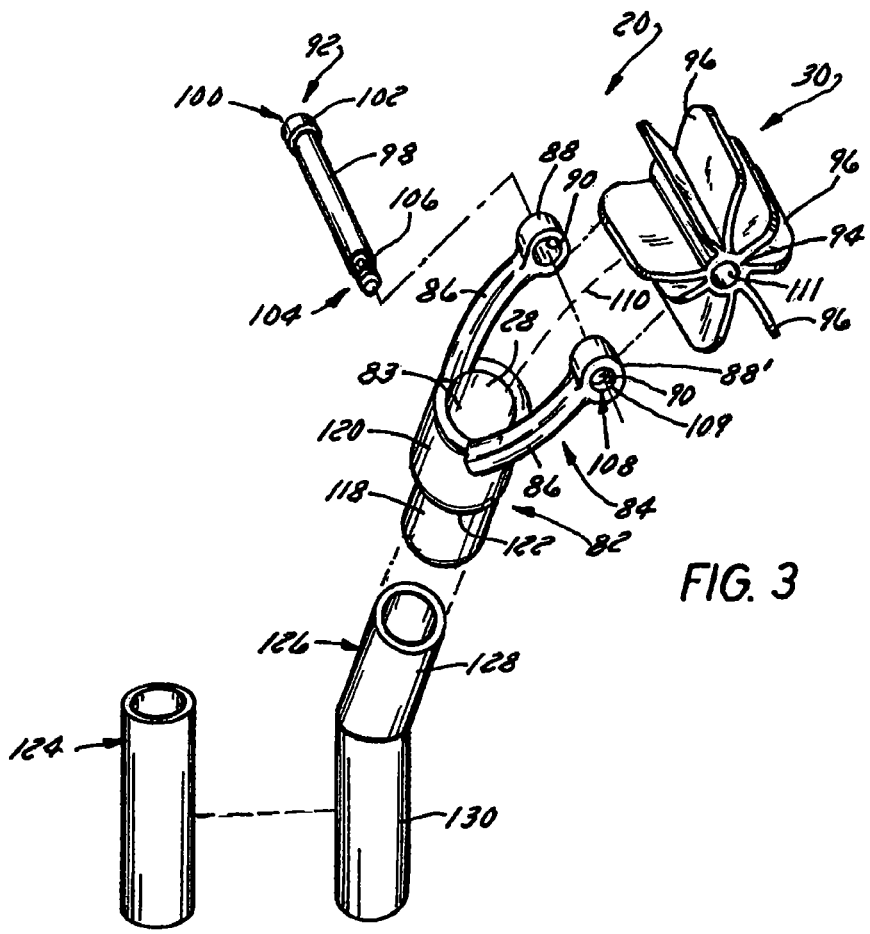
FIG. 3 is an exploded perspective view of one preferred embodiment of a water wheel aerator.
Figure 4:
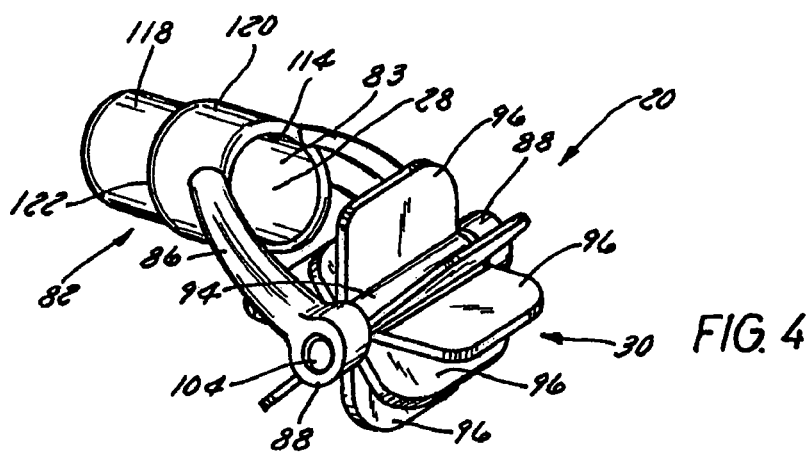
FIG. 4 is an assembled perspective view of another preferred water wheel aerator.

With specific reference to FIG. 3, pin 92 is elongate and includes a journal 98 disposed between its ends with one end 100 having a head 102 that engages with the knuckle 88 when inserted through knuckle openings 90 and the other end 104 engages with the other knuckle 88 to releasably retain the pin 92 in place when fully inserted. In the preferred embodiment shown in FIG. 3, the engagement end 104 of the pin 92 includes a groove 106 formed in it that receives a detent 108 disposed inside the opening 90 of one of the knuckles 88 that is received in the groove 106 when the pin 92 is fully inserted. Detent 108 is preferably a radially inwardly extending annular rib 109 that snaps into the groove 106 in the pin 92 such that a snap fit is provided therebetween when the pin 92 is fully inserted that keeps the pin 92 in place. Each knuckle 88 is a trunnion that rotatively supports part of the pin 92.

Figure 5:
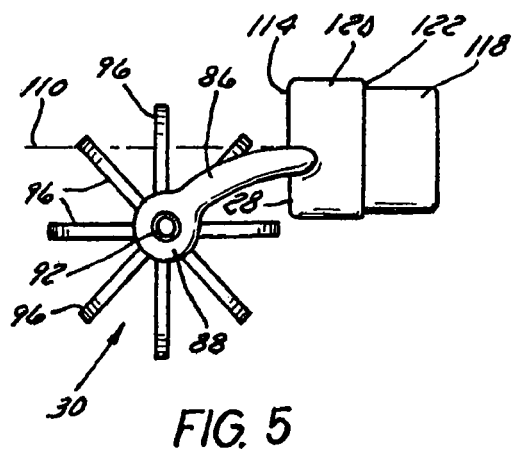
FIG. 5 is a side elevation view of the water wheel aerator of FIG. 4.
Figure 6:
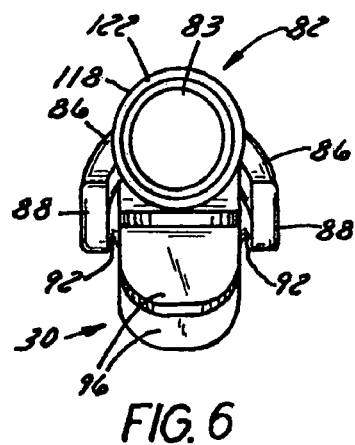
FIG. 6 is a rear plan view of the water wheel aerator.
Figure 7:
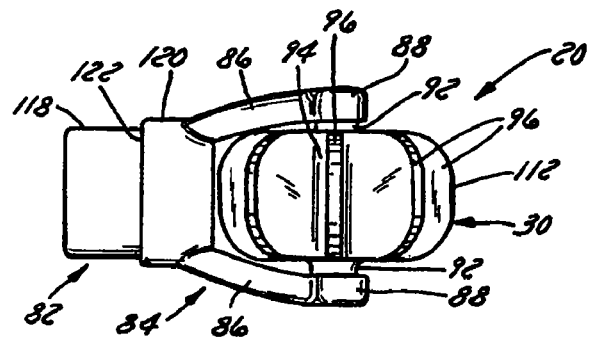
FIG. 7 is a top plan view of the water wheel aerator.
Figure 8:
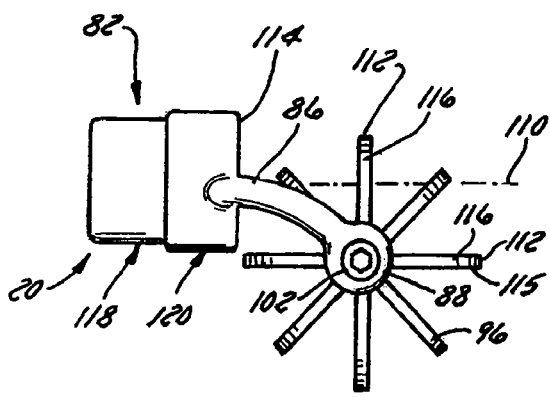
FIG. 8 is another side elevation view of the water wheel aerator.
Figure 9:
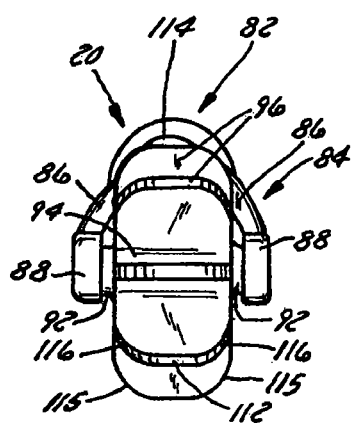
FIG. 9 is a front plan view of the water wheel aerator.
Figure 10:
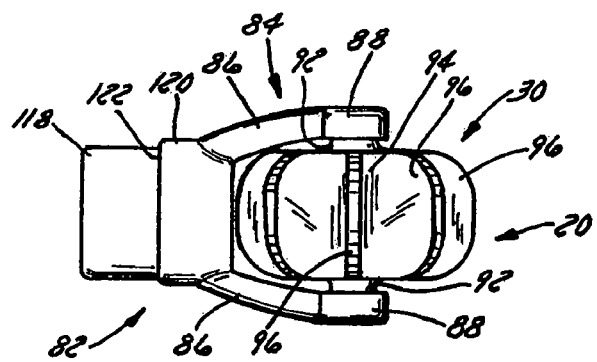
FIG. 10 is a bottom plan view of the water wheel aerator.

Arms 86 are configured to offset the pin 90 and hence the rotational axis (hub bore 111) of the rotor 30 so the rotor 30 is offset from the center line 110 of the outlet 28 to ensure the stream 25 discharged from the outlet 28 impinges against part of the rotor 30 that causes the rotor 30 to rotate. As is best shown by FIG. 5, each arm 86 can be curved from the outlet center line 110 to offset the rotor 30 giving the water wheel aerator 20 a spur-like appearance. Impingement not only causes aeration-inducing turbulence but also rotates the rotor 30. The energy transferred from the water stream 25 impinging against the rotor 30 causes momentum of the stream 25 to be dissipated as it is transferred into rotor rotational kinetic energy, thereby reducing splashing of water discharged from outlet 28 into the lower basin 32. Depending on the volumetric flow rate of the pump 24 enough stream momentum can be dissipated by the rotor 30 such that an animal-enticing "bubbler" or "bubbling spring" effect is produced.

As is best shown in FIG. 3, each baffle 96 has a width substantially as wide as the width or diameter of the outlet 28 formed in the mount 82. Each baffle 96 has a length that enables the outer radial edge 112 of each baffle 96 to extend radially outwardly and substantially overlie a portion 114 of the outlet 28 opposite the offset. Such a baffle 96 construction helps ensure that the stream 25 exiting outlet 28 will impinge on a great enough surface area of at least one of the baffles 96 that aeration-inducing turbulence will occur along with rotation of the rotor 30. In a preferred embodiment shown in FIG. 3, each baffle 96 is generally rectangular having a generally straight outer radial edge 112 along with a pair of generally parallel side edges 116 that can intersect via rounded corners 115. While the baffles 96 can each be generally planar, each baffle 96' can be concave as shown in FIG. 2 with the concavity of each baffle 96 facing toward the outlet 28 when stream 25 is impinging against it to help increase turbulence and hence aeration.

With continued reference to FIG. 3, the mount 82 is generally cylindrical having a tubular fluid-conveying insert 118 configured with a width or outer diameter that allows it to be inserted into an opening formed in the cover 34 or the discharge opening of anchor tube 68 while frictionally engaging the same to help prevent withdrawal. The mount 82 also includes an enlarged fluid-conveying collar 120 having a width or diameter greater than the outer diameter of the tubular insert 118 providing a stop 122 extending about its periphery that can abut against an outer surface of the cover 34 and/or anchor tube grommet 75 (such as depicted in FIG. 2).

Figure 2:
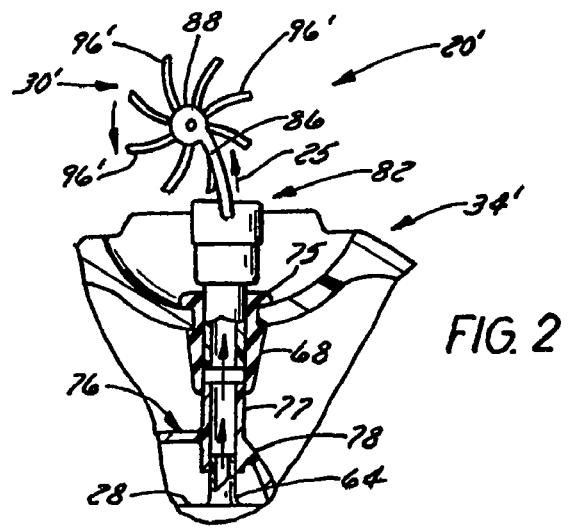
FIG. 2 is a fragmentary cross sectional view of the aerator inserted into a discharge opening in a cover of another embodiment of a pet fountain showing the water wheel being rotated by discharged water in a counterclockwise direction.

As is also shown in FIG. 2, such a mount configuration enables a fluid-conveying extension 124 or fluid-conveying elbow 126 to be coupled to the mount 82 such as by telescoping engagement with the tubular insert 118 of the mount 82. For example, as shown in FIG. 1, one section 128 of the elbow 126 is telescopically received by the tubular insert 118 with the other section 130 of the elbow 126 is inserted into the discharge opening of the anchor tube 68 in a manner that provides frictional engagement therebetween, which is facilitated by the elastomeric construction of the anchor tube 68. Where elbow section 128 is telescoped over the tubular insert 118, its free end can abut against stop 122. If desired, elbow section 128 and/or extension 124 can telescope within tubular insert 118. As is shown in FIG. 1, when used with an elbow 126, the water wheel aerator assembly 20 can be positioned or oriented in a manner where flow of the stream 25 is directed at an angle relative to the anchor tube 68. Use of such an elbow 126 thereby can also angle the direction of the stream 25 discharged from the rotor mount conduit outlet 28 so gravity helps facilitate rotor rotation. By directing the stream 25 at an angle, its momentum, even after baffle impingement, helps propel it above and beyond the rotor hub thereby enabling gravity acting on the stream at that point to cause the water to fall downwardly into the basin imparting more rotational energy to the rotor.

In a preferred embodiment, the mount 82 is formed of dish-washer safe plastic with its arms 86 integrally formed therewith, such as by a plastic molding process or the like. Rotor 30 and pin 92 are also formed of dish-washer safe plastic.

In assembly, rotor 30 is manipulated so its hub 94 is disposed between arms 86 with the hub 94 generally axially aligned with the holes 86 in the arms 88 enabling the pin 92 to be inserted therethrough. Once the pin 92 is inserted far enough so its detent end engages corresponding knuckle 86, the water wheel aerator assembly 20 can be assembled to a fountain 22, such as the fountain shown in FIG. 1 or FIG. 2. Where used without an extension or elbow, the assembled aerator 20 is grasped, maneuvered relative to the discharge outlet of the fountain cover 34 or anchor tube 68, and telescopically inserted into the outlet or tube. Frictional engagement therebetween retains the inserted aerator 20 during fountain use and operation.

During pump operation, water is pumped out the pump discharge 64 into anchor tube 68 where it flows through the tubular water-flow conduit 83 integrally formed of the rotor mount 82 and out its outlet 28. The stream 25 of water discharged from the outlet 28 impinges against at least one baffle 96 transferring its momentum to the rotor 30 causing the rotor 30 to rotate. As the rotor 30 rotates, its movement can entice attention of an animal, such as a cat, into approaching the fountain 22.

During pump operation, continuous recirculation of the water 26 through the fountain 22 causes the water wheel rotor 30 to continuously rotate. This not only produces eye-catching movement but also a bubbling appearance at and around the aerator 20 thereby helping to get the attention of a nearby animal that can encourage interaction. In addition, reducing momentum of the stream 25 discharged from the aerator outlet 28 also reduces, if not virtually eliminates splashing, which helps further quiet pump operation. As a result, a pump 28 equipped with a noise and vibration reducing pump mounting arrangement, e.g., suction cups, and noise and vibration attenuating anchor tube 68, is further quieted when a water wheel aerator assembly 20 constructed in accordance with the present invention is used.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. An aerator assembly for a pet fountain comprising:
    a rotor mount comprising an outlet from which water is discharged; and
    a rotor disposed downstream of the outlet so that water discharged from the outlet arches over the top of the rotor and falls down the rotor causing rotor rotation;
    wherein the rotor mount comprises (i) a tubular conduit having the outlet at one end, (ii) a pair of outwardly extending spaced apart arms each having a trunnion, and (iii) a pin carried by the trunnions that also carries the rotor, and wherein the arms space the rotor axially outwardly of the outlet and offset the rotor from a center of the outlet.

2. The pet fountain aerator assembly of claim 1 wherein the rotor comprises (i) a hub that receives the pin therethrough and (ii) a plurality of flow directors.

3. The pet fountain aerator assembly of claim 2 wherein each flow director comprises a baffle.

4. The pet fountain aerator assembly of claim 3 wherein each baffle has a width substantially as wide as the outlet.

5. The pet fountain aerator assembly of claim 4 wherein each baffle has a length enabling an outer edge of the baffle to substantially overlie a side of the outlet opposite the offset.

6. An aerator assembly for a pet fountain comprising:
    a rotor comprised of a plurality of pairs of radially outwardly extending flow directors, each flow director comprising a water-deflecting baffle; and
    a rotor mount rotatively carrying the rotor, the rotor mount comprising a tubular conduit removably received in a discharge opening of the pet fountain and having an outlet directing water flow discharged from the discharge opening through the conduit against the rotor rotating the rotor, the rotor mount comprising a fork rotatively carrying the rotor offsetting a rotational axis of the rotor from a centerline of the conduit outlet positioning at least one baffle in line with the conduit outlet when the rotor is rotating, the fork comprising a pair of spaced apart arms defining the fork, each arm of the fork comprising a trunnion, and a pin carried by the trunnions that carries the rotor.

7. The pet fountain aerator assembly of claim 6 wherein the rotor comprises a hub.

8. The pet fountain aerator assembly of claim 7 wherein the pin is received through the trunnions and the hub.

9. The pet fountain aerator assembly of claim 6 wherein the rotor mount comprises a stop that abuts against a portion surrounding the discharge opening when the rotor mount is inserted into the discharge opening.

10. The pet fountain aerator assembly of claim 6 wherein the pin comprises a head at one end that abuts one of the rotor mount arms and a groove at the opposite end that engages a detent of the other of the rotor mount arms.

11. The pet fountain aerator assembly of claim 10 wherein the pin comprises a portion journalled for rotation disposed between the ends of the pin.

12. The pet fountain aerator assembly of claim 10 wherein each one of the arms comprises a bore therethrough through which the pin extends with the bores being generally axially aligned and wherein the detent comprises a projection extending radially inwardly within one of the arm bores that is received in the groove in the pin.

13. A pet fountain comprising:
    a basin in which water is received;
    a cover carried by the basin having a discharge opening formed therein;
    a pump disposed in the basin and having a discharge tube from which water is expelled through the discharge opening in the cover; and
    an aerator assembly having a rotor mount with a tubular fluid conduit inserted into the discharge opening formed in the cover and a rotor rotatively carried by the rotor mount that is rotated by water discharged from the tubular fluid conduit.

14. The pet fountain of claim 13 wherein the rotor comprises a plurality of pairs of radially outwardly baffles against which water discharged from the tubular fluid conduit impinges.

15. The pet fountain of claim 14 wherein (a) the fluid conduit has one end in fluid flow communication with the pump discharge tube and the other end comprising an outlet disposed adjacent the baffles, and (b) the rotor mount comprises an arm carrying the rotor permitting rotation of the rotor relative thereto with the arm offsetting a rotational axis of the rotor relative to a center line of the conduit outlet such that the center line is spaced from and does not pass through the rotor rotational axis.

* * * * *